United States Patent [19]

Ikeda

[11] Patent Number: 5,642,134
[45] Date of Patent: Jun. 24, 1997

[54] INTEGRATED TABLET DEVICE HAVING POSITION DETECTING FUNCTION AND IMAGE DISPLAY FUNCTION

[75] Inventor: Naoyasu Ikeda, Tokyo, Japan

[73] Assignee: NEC Corporation, Tokyo, Japan

[21] Appl. No.: 557,424

[22] Filed: Nov. 13, 1995

[30] Foreign Application Priority Data

Nov. 17, 1994 [JP] Japan ................................. 6-307069

[51] Int. Cl.⁶ ..................................................... G08C 21/00
[52] U.S. Cl. ..................................................... 345/174; 178/19
[58] Field of Search ............................. 345/104, 38, 158, 345/173, 174, 176; 178/18, 19

[56] References Cited

U.S. PATENT DOCUMENTS

| | | | |
|---|---|---|---|
| 4,999,461 | 3/1991 | Murakami et al. | 178/19 |
| 5,266,750 | 11/1993 | Yatsuzuka | 178/19 |
| 5,381,160 | 1/1995 | Landmeier | 345/174 |
| 5,428,417 | 6/1995 | Lichtenstein | 353/122 |
| 5,438,168 | 8/1995 | Wolfe et al. | 345/174 X |
| 5,461,400 | 10/1995 | Ishii et al. | 345/182 |
| 5,496,974 | 3/1996 | Akebi et al. | 345/174 X |
| 5,550,329 | 8/1996 | Matsubayashi | 178/19 X |
| 5,567,920 | 10/1996 | Wantanabe et al. | 178/18 |

*Primary Examiner*—Mark R. Powell
*Attorney, Agent, or Firm*—Whitham, Curtis, Whitham & McGinn

[57] ABSTRACT

A coordinate defining signal is applied to an counter electrode in a period different from a writing period of voltages to pixel electrodes, and detected by way of an electrostatic capacitive coupling to determine a coordinate. Concurrently, to avoid a malfunction due to noises, gate and source drivers have their operations interrupted in the non-writing period. To prevent a variation of the coordinate defining signal due to capacitance variations of liquid crystal, an output of a driver for a scan or signal line is subjected to a high impedance in the non-writing period to isolate scan lines or signal lines. A light weight compact device is implemented.

19 Claims, 11 Drawing Sheets

INTEGRATED TABLET DEVICE HAVING POSITION DETECTING FUNCTION AND IMAGE DISPLAY FUNCTION

BACKGROUND OF THE INVENTION

The present invention relates generally to a tablet device that inherently has a position detecting function for detecting an indicated position thereon defined by a combination of associated coordinates as a position data to be input to a certain device coupled therewith, and particularly, to a tablet device integrated with a display device that inherently has an image display function, or in other words, to an integrated tablet device having both the position detecting function and the image display function.

1. Description of the Related Art

FIG. 1 shows an exploded view, in part, of a typical conventional tablet device.

The typical conventional tablet device includes a sheet-like tablet member 48 assembled with a sheet-like display member 47. The members 47 and 48 are fabricated as separate products and tight-sticked together. Designated at reference character 49 is a pen member for pointing a position on the tablet member 48 to generate a position signal.

The display member 47 may comprise e.g. a liquid crystal display. The tablet member 48 may be e.g. an electro-static capacitive coupling type.

Such a conventional tablet device including a tablet member assembled with a display member separately fabricated has an undesirable weight and an undesirable volume of which undisregardable fractions are attributable to the tablet member, respectively, in addition to that it needs a costly assembly process.

Still more, in use of such the conventional tablet device, the tablet member which intervenes between the display member and a point of a pen member tends to cause a parallax so that the pen point may be located at a position deviated from a position to be indicated on the display member.

To solve such conventional problems, the Japanese Patent Application Laid-Open Publication No. 2-255911 has proposed a tablet device in an integrated form having both a position detecting function and an image display function.

This conventional integrated tablet device comprises an image display system including a display member, and a position detecting system for detecting a pointed position on the display member.

The image display system comprises the display member which is composed of a thin-film EL (electroluminescence) panel consisting of a matrix of EL pixels, a row electrode driver for sequentially driving to scan respective rows of the pixel matrix, via their bus lines, a column electrode driver for selectively driving respective columns of the pixel matrix, via their bus lines, so that selected ones of scanned pixels are operated to display an image, and a timing generator for generating a timing signal to control the drivers, as well known.

The position detecting system comprises: in a wide sense, a coordinate defining system for defining a set of coordinates on the display member, a pen as a position pointing member for pointing a position on the display member, and coordinate detecting circuitry, connected to the coordinate defining system, the pen and the timing generator, for detecting a combination of coordinates of the pointed position: and in a narrow sense (as used herein), the coordinate defining system and the coordinate detecting circuitry.

The coordinate defining system comprises the row and column electrode drivers and the row and column bus lines of the image display system, as the bus lines are sequentially scanned by applying scan pulses from the drivers in a coordinate detection mode such that, when a bus line corresponding to a position pointed by the pen is scanned, the pen senses a significant potential due to an electrostatic capacitive coupling in a vicinity of the pointed position, which potential is input to the coordinate detecting circuitry, where it is detected as a coordinate represented by the scanned bus line.

The scan pulses may be superimposed on pixel drive signals, or may be applied during a position detecting period separated from an image display period in a time-dividing manner.

In the conventional integrated tablet device, the image display system of a thin-film EL type, in which the pixel driving bus lines are commonly employed as an essential part of the coordinate defining system, may theoretically include an active-matrix type liquid crystal display (hereafter "TFT-LCD") having a matrix of pixels using a thin-film field effect transistor (hereafter "TFT").

FIG. 2 is an exploded perspective view, in part, of a typical TFT-LCD.

The typical TFT-LCD comprises an unshown timing signal generator, an unshown gate drive circuit, an unshown source drive circuit, and a display member provided with an unshown light source.

As partially shown in FIG. 2, the display member comprises a TFT substrate 50, an counter electrode 54 facing the TFT substrate 50, and a quantity of unshown liquid crystal filled in a gap between the TFT substrate 50 and the counter electrode 54.

The TFT substrate 50 is formed with a matrix of switching TFTs, a multiplicity of parallel gate bus lines 51 for connecting the gate drive circuit to gate electrodes of TFTs in rows (or columns) of the TFT matrix, a multiplicity of parallel source bus lines 52 for connecting the source drive circuits to source electrodes of TFTs in columns (or rows) of the TFT matrix, and a matrix of pixel electrodes 53 one-to-one connected to drains of the TFTs.

Each pixel is composed of one of the pixel electrodes 53 connected, a corresponding area of the counter electrode 54, and a corresponding volume of liquid crystal resting therebetween so that a pixel capacity 55 is established thereacross.

The TFT-LCD of FIG. 2 may be employed as a direct-view personal display of either of two back-lighted types. In a first back-lighted type, the light source is located (in FIG. 2) above the counter electrode 54, which thus intervenes between the light source and the TFT substrate 50 which faces a user. In a second back-lighted type, the light source is located (in FIG. 2) under the TFT substrate 50, which thus intervenes between the light source and the counter electrode 54 which faces a user.

The TFT-LCD of the second back-lighted type is now supposed to be employed as an image display system of an integrated tablet device so that, in a coordinate detection mode, the gate and source bus lines 51 and 52 constitute a coordinate defining system to which the gate and source drive circuits supply coordinate identifying scan pulses.

In the coordinate detection mode, a pen member is to point a position on an external surface of the counter electrode 54, which intervenes between a user and the TFT substrate 50 on which the bus lines 51 and 52 are formed.

In this arrangement, however, the counter electrode 54 constitutes an electrical shield member so that it may be difficult to effectively detect, by way of an electrostatic capacitive coupling, a coordinate identifying scan pulse supplied to one of the bus lines 51 and 52.

Still more, the source drive circuit, which inherently is adapted to supply image signals, is needed to serve for supplying the coordinate identifying scan pulses in a superimposing manner or time-dividing manner, thus resulting in significant increases such as in complexity, weight and volume of associated circuitry.

The present invention has been achieved with such points in mind.

SUMMARY OF THE INVENTION

Therefore, it is an object of the present invention to provide an integrated tablet device of which an image display system is composed of a TFT-LCD, permitting an effective detection of a coordinate identifying scan pulse, as a light source is located behind a TFT substrate.

It also is an object of the present invention to provide an integrated tablet device of which an image display system is composed of a TFT-LCD without significant increases such as in complexity, weight and volume of circuitry.

To achieve the objects, a genus of the present invention provides an integrated tablet device comprising an image display system composed of a liquid crystal display of an active matrix type for displaying an image in a display region thereof, the liquid crystal display including an insulating substrate, a plurality of scan lines formed in parallel on the insulating substrate, a plurality of signal lines formed in parallel on the insulating substrate, the plurality of signal lines crossing the plurality of scan lines so that a matrix of lattice points are defined therebetween, a thin-film transistor formed in a vicinity of a respective one of the lattice points, a pixel electrode connected to the thin-film transistor, an opposite substrate opposing the insulating substrate, an counter electrode formed on the counter electrode, and a quantity of liquid crystal filled between the insulating substrate and the opposite substrate so that the pixel electrode and the counter electrode has a pixel capacity established therebetween through the liquid crystal, and a position detecting system for detecting a pointed position on the display region, the position detecting system being constituted with the image display system so that in a first period a first signal for displaying the image is written to the pixel electrode and in a second period different from the first period a second signal for identifying a coordinate of the pointed position is applied to the counter electrode so that the coordinate is identifiable from the second signal, as it is sensed by way of an electrostatic capacitive coupling.

According to a species of the genus of the invention, the image display system further includes a signal line drive circuit for driving the plurality of signal lines, the signal line drive circuit being controlled to have an output thereof subjected to a relatively high impedance, as the second signal is applied to the counter electrode, so that the plurality of signal lines are substantially electrically isolated from the signal line drive circuit.

According to another species of the genus of the invention, the image display system further includes a scan line drive circuit of a static type for driving the plurality of scan lines and a signal line drive circuit of a static type for driving the plurality of signal lines.

According to another species of the genus of the invention, the position detecting system further comprises a data memory for storing therein a predetermined data including a relationship between the second signal and the coordinate, the data memory being referenced in response to the second signal, as it is sensed, to output the predetermined data.

According to another species of the genus of the invention, the coordinate of the pointed position comprises a first coordinate identifiable by the second signal, as it is applied to the counter electrode through a corresponding one of the plurality of scan lines, and a second coordinate identifiable by the second signal, as it is applied to the counter electrode through a corresponding one of the plurality of signal lines, and the second signal identifying the first coordinate and that identifying the second coordinate have signal periods thereof time-divided to each other.

According to another species of the genus of the invention, the coordinate of the pointed position comprises a first coordinate identifiable by the second signal, as it is applied as a first alternating-current signal to the counter electrode through a corresponding one of the plurality of scan lines, and a second coordinate identifiable by the second signal, as it is applied as a second alternating-current signal to the counter electrode through a corresponding one of the plurality of signal lines, the first and second alternating-current signals as they are applied have signal periods thereof overlapping each other and frequencies thereof different from each other, and the first and second alternating-current signals as they are sensed are subjected to frequency-filtering processes respectively so that the first and second coordinates are substantially concurrently identifiable.

Therefore, in an integrated tablet device according to the genus of the invention, a position detecting system employs an counter electrode of an image display system as a coordinate defining system, neither providing additional exclusive electrodes therefor nor following a conventional use of TFT substrate side components, thus permitting a position pointing member to effectively sense to catch a coordinate identifying signal from the counter electrode by way of an electrostatic capacitive coupling therebetween, when a light source is located behind an insulating substrate formed with TFTs.

Moreover, in an integrated tablet device according to a species of the genus of the invention, a signal line drive circuit that may include an output stage composed of a driver IC (integrated circuit) has an output thereof subjected to a relatively high impedance, as a coordinate identifying signal is applied to a counter electrode, thereby permitting a time constant for a detection of a position to be kept free from deviations that otherwise might be caused by a variation of a liquid crystal capacitance between the counter electrode and bus lines, due to differences of potentials developed along the bus lines. Accordingly, the integrated tablet device is kept free from influences due to a capacitance variation.

BRIEF DESCRIPTION OF THE DRAWINGS

The above and other objects, advantages and features of the present invention will become more apparent from the consideration of the following detailed description of preferred embodiments in conjunction with the accompanying drawings, in which.

DESCRIPTION OF THE PREFERRED EMBODIMENTS

Figure 1:
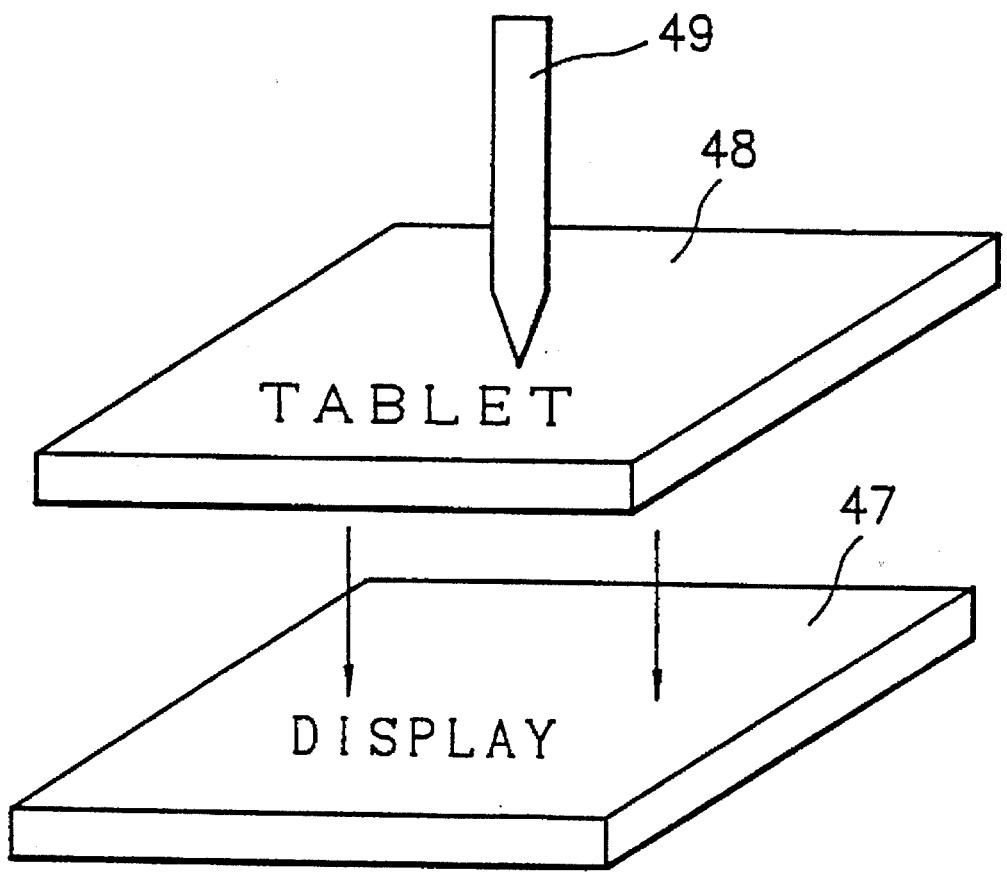
FIG. 1 is a schematic exploded perspective view of a conventional tablet device assembled with a display device.
Figure 2:
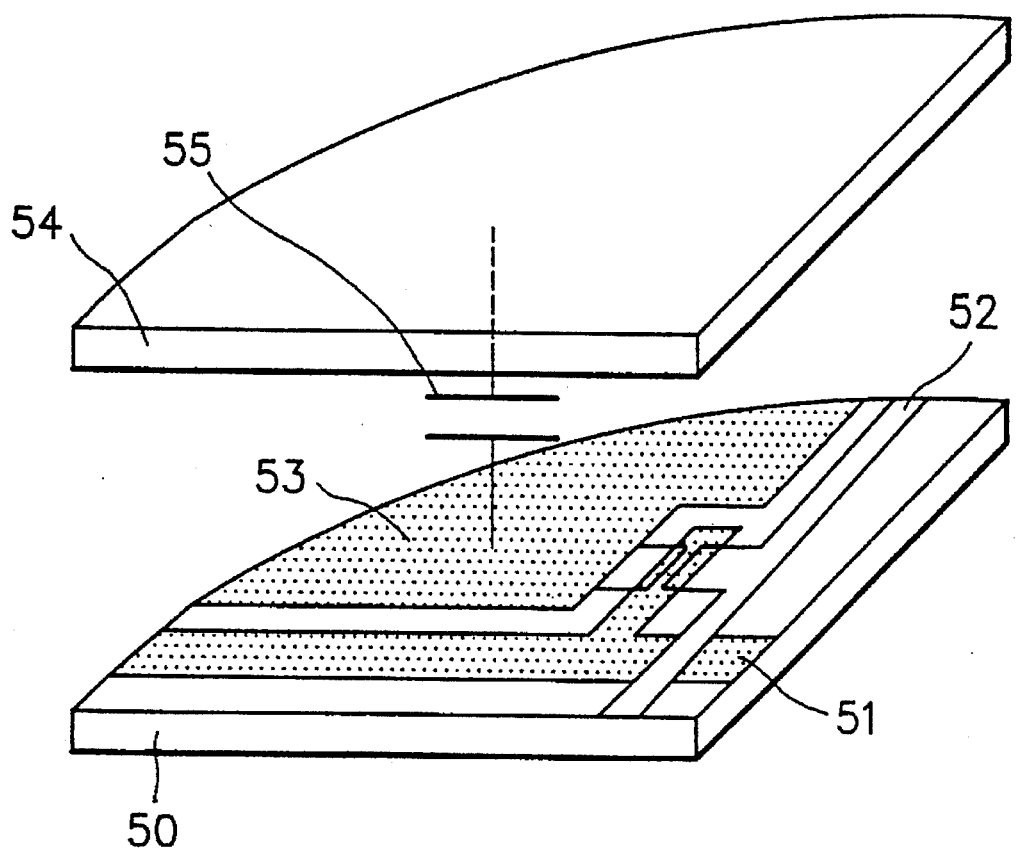
FIG. 2 is a fragmentary exploded perspective view of a conventional typical TFT-LCD.

The preferred embodiments of the present invention will be described below with reference to the accompanying drawings. Like members are designated by like reference characters.

A first embodiment of the invention will be described in connection with FIGS. 3 to 9.

Figure 3:
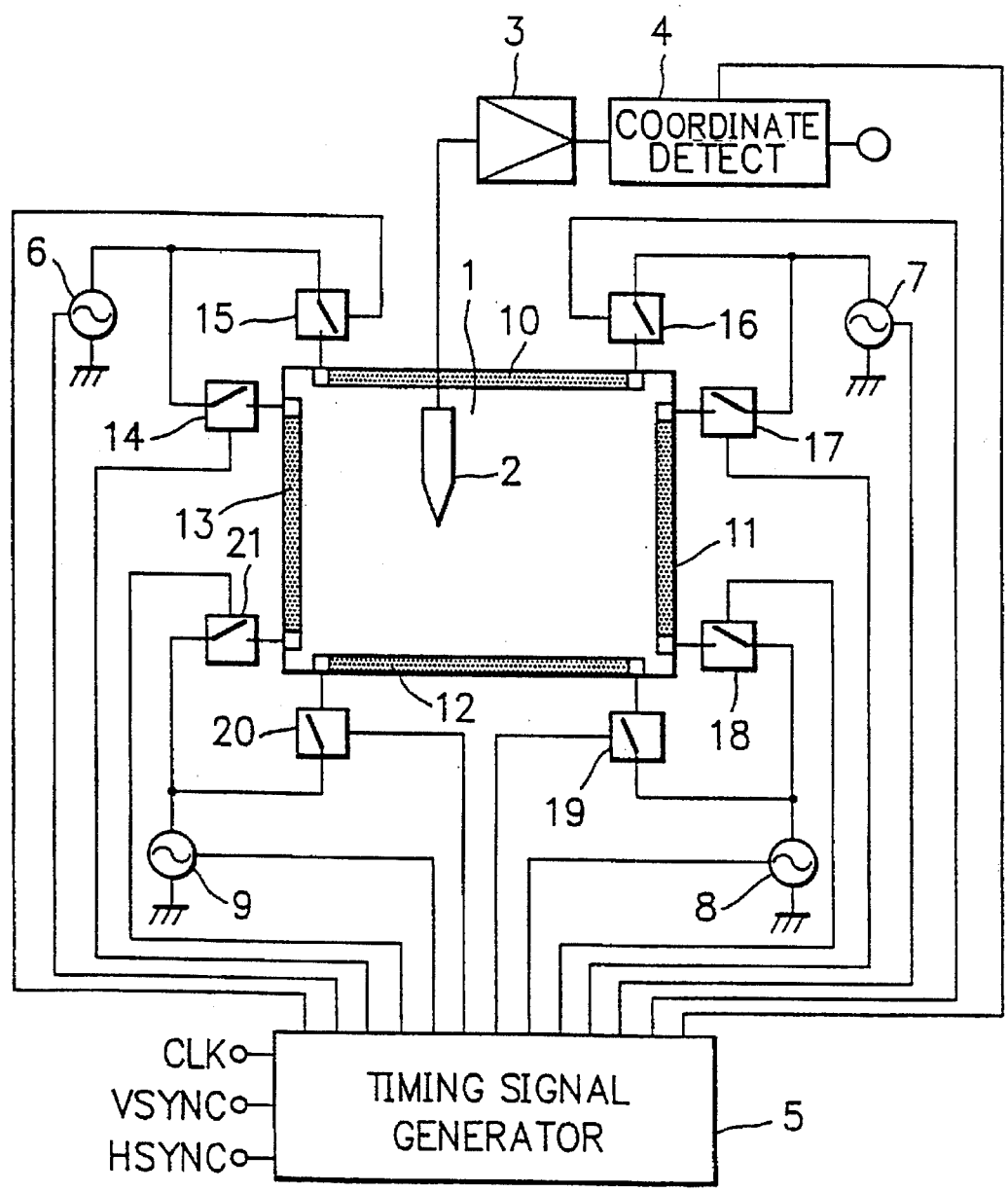
FIG. 3 is a block diagram of an integrated tablet device according to an illustrative embodiment of the invention.

FIG. 3 illustrates as an illustrative embodiment an integrated tablet device according to the present invention.

The integrated tablet device comprises an image display system (hereafter sometimes simply "display") composed of a TFT-LCD having an opposite substrate formed with an counter electrode 1, and a position detecting system (hereafter sometimes simply "tablet") constituted with the display.

Incidentally, the description below will cover operations of the tablet in a blanking period in which an order of scan returns from a last line to a first line. Each coordinate of a digit or dot is defined relative to a predetermined origin (0, 0) at a lower right corner of a display region.

As shown in FIG. 3, the integrated tablet device includes the counter electrode 1 which is made of an ITO (indium tin oxide), a pen 2 (as part of the tablet in a wide sense) for pointing an arbitrary position on the opposite substrate to detect a signal identifying a coordinate of the pointed position, an amplifier circuit 3 for amplifying an output signal of the pen 2, and a coordinate detecting circuit 4 for calculating a combination of coordinates in vertical and horizontal directions on a basis of an output signal of the amplifier circuit 3.

The integrated tablet device further comprises a timing signal generator circuit (hereafter "timing generator") 5, four signal generator circuits (hereafter "signal generator") 6, 7, 8 and 9 individually controllable by the timing generator 5, a rectangle of four metal electrodes 10, 11, 12 and 13 extending along four sides of the counter electrode 1 and each respectively connected at both ends thereof to one-sided two 6, 7; 7, 8; 8, 9; and 9, 6 of the four signal generators 6 to 9, respectively, and four pairs of switching circuits (hereafter "switch") 14, 15: 16, 17; 18, 19: and 20, 21 cut in the connections between the metal electrodes 10 to 13 and the signal generators 6 to 9.

The timing generator 5 generates a combination of timing signals for a variety of controls, e.g. to select one of three operation periods: a writing period for writing image signals to pixels in an operation of the TFT-LCD, a horizontal position detecting period for detecting a horizontal coordinate x of a pointed position on the opposite substrate, and a vertical position detecting period for detecting a vertical coordinate y of the position.

The signal generators 6 to 9 are individually selectable to output a voltage to be applied to the counter electrode, when writing a signal to a pixel electrode, and a position detecting signal in dependence on an output of the timing generator 5.

The metal electrodes 10 to 13 are connected to the counter electrode 1.

The switches 14 to 21 are individually on-off controllable in dependence on an output of the timing generator 5.

The timing of each operation of such circuits of the integrated tablet device is controlled by an output of the timing generator 5.

Figure 4:
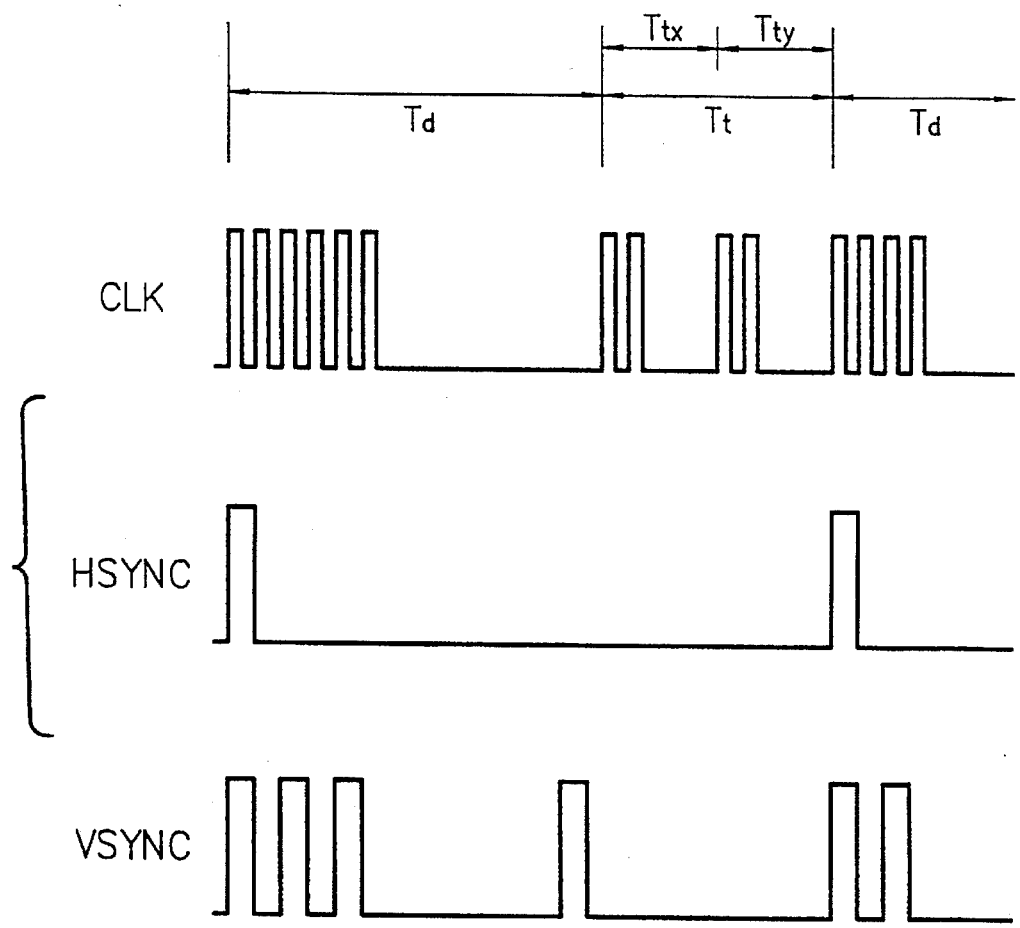
FIG. 4 is a timing chart of input and output signals of a timing signal generator of the integrated tablet device of FIG. 3.

FIG. 4 shows a relationship between input and output signals to and from the timing generator 5.

Three signals, i.e. a clock signal CLK, a horizontal synchronizing signal HSYNC and a vertical synchronizing signal VSYNC are input to the timing generator 5. Depending on the input signals, the timing generator 5 determines a display writing operation period Td and a tablet operation period Tt.

In the display writing operation period Td, the timing generator 5 turns on all switches 14 to 21 and applies outputs of the signal generators 6 to 9 to the metal electrodes 10 to 13.

Concurrently, the timing generator 5 sends out a signal for informing the signal generators 6 to 9 that the integrated tablet device is in the display writing operation period Td.

In response to the information signal, the signal generators 6 to 9 output DC voltages of an identical potential for driving liquid crystal. The metal electrodes 10 to 13 connected in a loop via the switches 14 to 21 does not have an effective resistance so that voltages of the signal generators 6 to 9 have an identical potential. Hence, voltages developed on the counter electrode 1 connected to the metal electrodes 10 to 13 also have an identical potential over the entire area of its surface.

After a writing of one frame is finished, the operation enters the tablet operation period Tt.

As shown in FIG. 4, the tablet operation period Tt is divided into a horizontal coordinate detection period Ttx and a vertical coordinate detection period Tty.

In the horizontal coordinate detection period Txt, first, the switches 14, 17, 18 and 21 of FIG. 3 are turned on by outputs of the timing generator 5. Then, in response to a signal representing the horizontal coordinate detection period Txt received from the timing generator 5, the signal generators 6 and 9 output a stable AC signal for tablet operation, while the signal generators 7 and 8 output a 0 (V).

The AC signal is applied to the metal electrode 13 and the 0 (V) is applied to the metal electrode 11. Thus, a two-dimensional electric field having equi-potential lines thereof parallel to the metal electrodes 11 and 13 is developed on the counter electrode 1.

Figure 5:
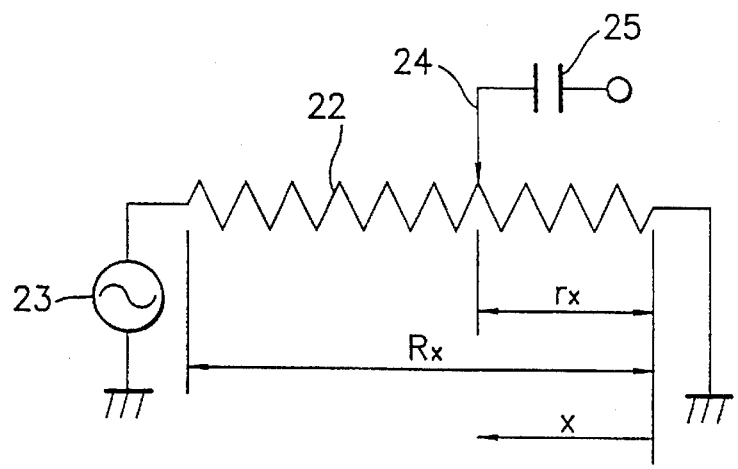
FIG. 5 is a circuit diagram of an equivalent circuit of a position detecting system of the integrated tablet device of FIG. 3.

FIG. 5 shows an equivalent circuit to such a circuit state.

The equivalent circuit comprises a resistor 22 representative of a resistance of the counter electrode 1, a signal source 23 corresponding to the signal generators 6 and 9, a signal detection terminal 24 as a point of the pen 2, and a capacitive component 25 of the opposite substrate between the counter electrode 1 and the pen 2.

Letting E (V) be a voltage supplied from the signal source 23, $R_x$ ($\Omega$) be a resistance along a total length of the resistor 22 in the horizontal direction, $r_x$ ($\Omega$) be a resistance along a length to a detection point defined by a distance x in the horizontal direction from the origin (0,0), and $E_x$ (V) be a voltage detected by the signal detection terminal 24 at the detection position x, it so follows that:

$$E_x = E \times r_x / R_x \quad (1).$$

The voltage $E_x$ is proportional to the distance x in the horizontal direction, thus permitting a calculation of the distance x.

In the vertical coordinate detection period Tty, first, the switches 15, 16, 19 and 20 are turned on by outputs of the timing generator 5. Then, in response to a signal representing the vertical coordinate detection period Tty received from the timing generator 5, the signal generators 6 and 7 output a stable AC signal for tablet operation, while the signal generators 8 and 9 output a 0 (V).

The AC signal is applied to the metal electrode 10 and the 0 (V) is applied to the metal electrode 12. Hence, a two-dimensional electric field having equi-potential lines thereof parallel to the metal electrodes 10 and 12 is developed over the counter electrode 1.

Also in this case, an equivalent circuit similar to FIG. 5 is applicable so that a detection of a voltage $E_y$ by the pen 2 permits a calculation of the detection position, as it is defined by a distance y in the vertical direction from the origin (0,0).

Figure 6:
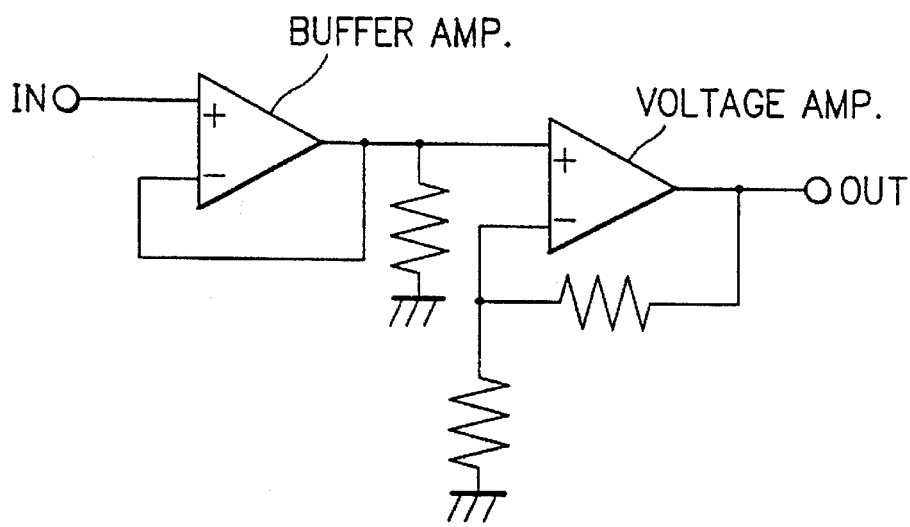
FIG. 6 is a circuit diagram of an amplifier of the integrated tablet device of FIG. 3.

FIG. 6 shows an example of the amplifier circuit 3 which amplifies voltage signals detected by the pen 2.

The capacity 25 between the counter electrode 1 and the point of the pen 2 is very small so that a low impedance input may bring about much noises, rendering a correct detection difficult.

Therefore, in FIG. 6, a detected signal by the pen 2 is input to a buffer amplifier having a relatively large input impedance to effect an impedance conversion, before it is input to a voltage amplifier. In other words, an amplification process is two-staged.

Figure 7:
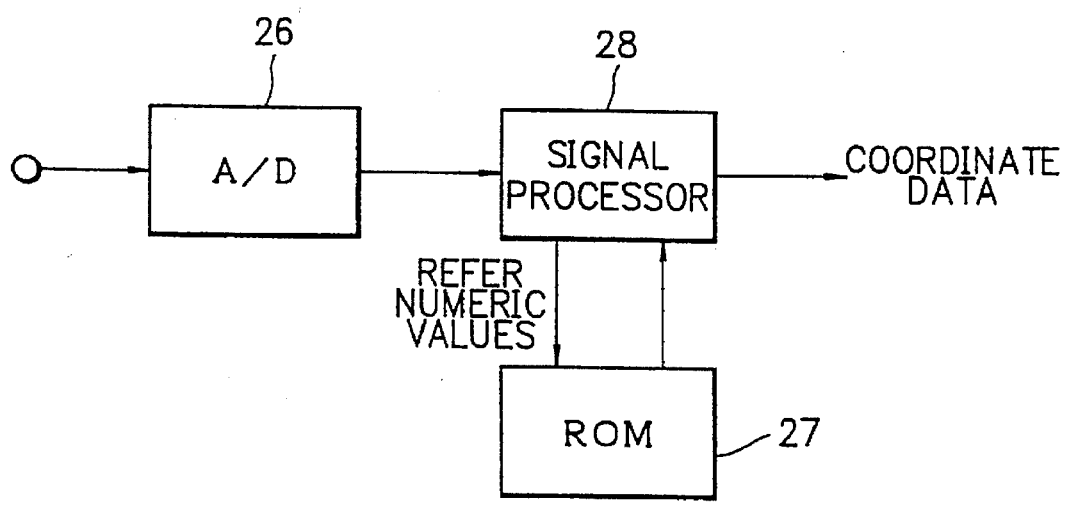
FIG. 7 is a block diagram of a coordinate detector of the integrated tablet device of FIG. 3.

FIG. 7 shows an example of the coordinate detecting circuit 4.

In the example, an analog signal output from the amplifier circuit 3 of FIG. 3 is converted into digital signals by an AD (analog-to-digital) converter 26. The analog signal output from the circuit 3 is an amplified signal of an input analog signal thereto, which is a function of a pointed position (x,y) on the opposite substrate. Therefore, the digital signal output from the AD converter 26 is also a function of the pointed position.

A relationship between an arbitrary position on the opposite substrate and the digital signal from the AD converter 26 is calculatable so that a set of coordinate data is predetermined and stored in a ROM 27, which is accessed by a signal processor 28 to read therefrom one data in accordance with an output of the AD converter 26 to output as positional information.

Figure 8:
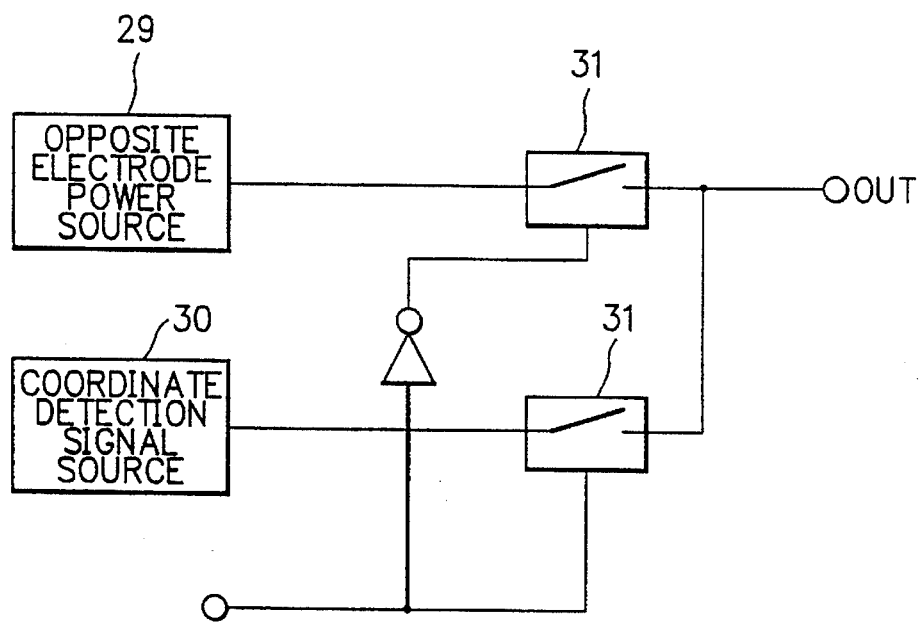
FIG. 8 is a block diagram of signal generators of the integrated tablet device of FIG. 3.

FIG. 8 illustrates an example of the signal generator 6. The other signal generators 7 to 9 may have like arrangements.

An counter electrode power source 29 supplies a voltage signal to liquid crystal in the display writing operation period Td, and a coordinate detection signal source 30 supplies a voltage signal to be detected by the pen 2 in the tablet operation period Tt. A pair of switch circuits 31 are operative in a timing controlled by the timing generator 5 to selectively output the voltage signals.

Incidentally, in FIG. 3, the electrodes 10 to 13 each comprise a conductive film disposed along a periphery of the counter electrode 1 to receive at both ends thereof those signals applied thereto for a detection of a pointed position on the opposite substrate. This arrangement may be modified by using external connections.

Figure 9:
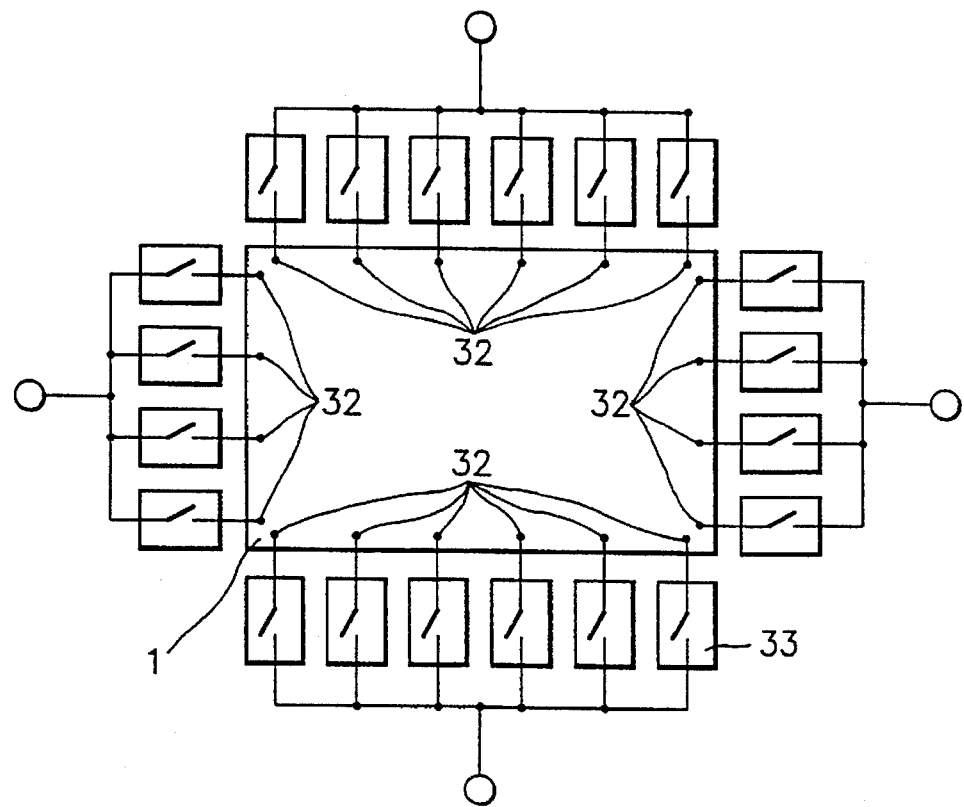
FIG. 9 is a schematic diagram describing a voltage application method according to the invention, as it is applied to the integrated tablet device of FIG. 3.

FIG. 9 shows a modified arrangement.

A plurality of external connection points 32 are provided in a periphery of the counter electrode 1, and a plurality of switch circuits 33 are connected to the connection points 32.

Voltages for driving liquid crystal or identifying position coordinates may be applied to the connection points 32 via the switch circuits 33 to develop a desired electric field on the counter electrode 1, with similar results to the first embodiment of FIG. 3.

Further, in the first embodiment, a horizontal coordinate identifying signal is separated from a vertical coordinate identifying signal in a time-dividing manner.

In a modification of such a signal application, horizontal and vertical coordinate identifying signals may comprise AC (alternating-current) signals, respectively, having signal periods thereof overlapping each other and frequencies thereof different from each other, and the AC signals as they are sensed by a pen member may be subjected to frequency-filtering processes, respectively, so that horizontal and vertical coordinates may be substantially concurrently identified.

In an integrated tablet device according to the first embodiment, a counter electrode is employed as part of a tablet, permitting a simplified structure, a reduced weight and a reduced volume in comparison with a conventional case. For example, a total weight may be reduced substantially to a half relative to the case of FIG. 1.

Figure 10:
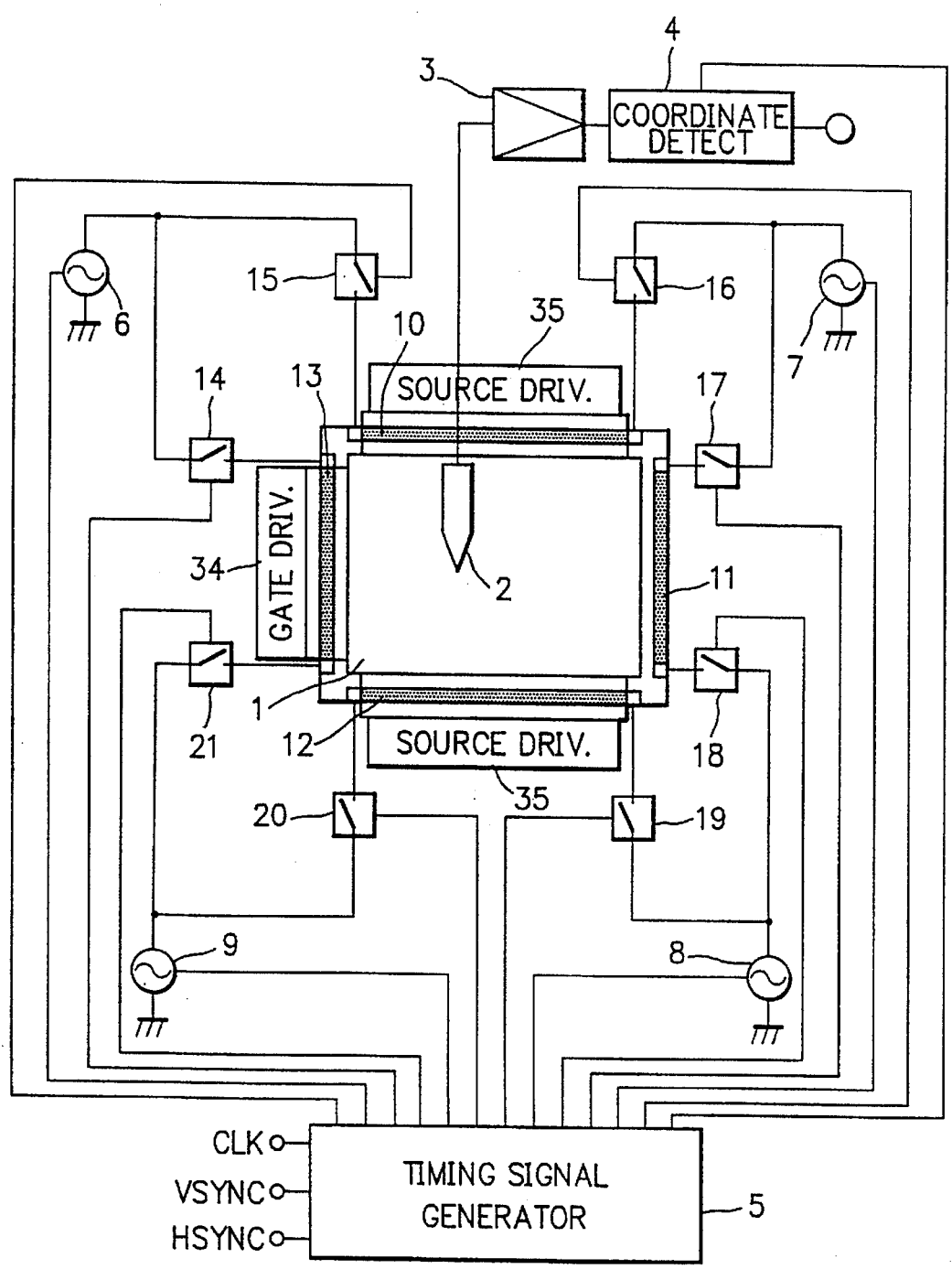
FIG. 10 is a block diagram of an integrated tablet device which is equivalent to the integrated tablet device of FIG. 3 provided with a gate driver and a pair of source drivers.

FIG. 10 shows an integrated tablet device which is equivalent to the integrated tablet device provided with a gate driver and a pair of source drivers;

In FIG. 10, a gate driver 34 and a pair of source drivers 35 for the TFT-LCD comprise static elements and operate independently of the clock speed.

Driver actions in a period Td for a display writing operation and a period Tt for a tablet operation are described below.

For better understanding, it is assumed a particular case in which a personal computer oriented display having a diagonal size of 24 cm and an RGB pixel matrix of vertical 480×horizontal 640 dots is combined with a source driver adaptive to select one of binary values "on" and "off" to output as a voltage level to liquid crystal.

Figure 11A:
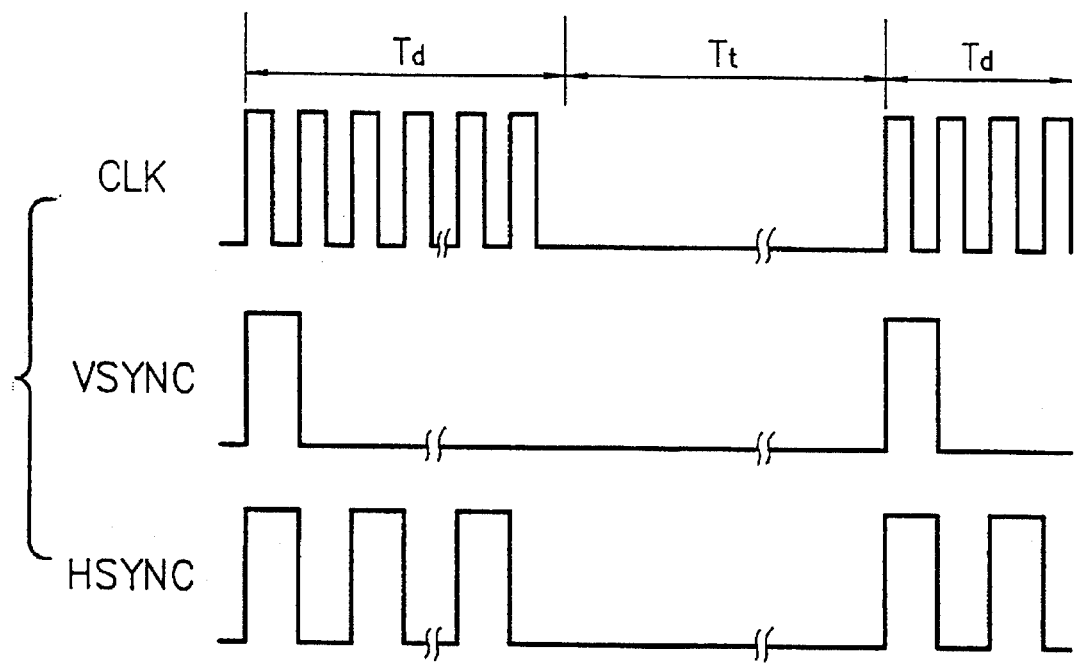
FIG. 11A is a timing chart of signals in the integrated tablet device of FIG. 10.
Figure 11B:
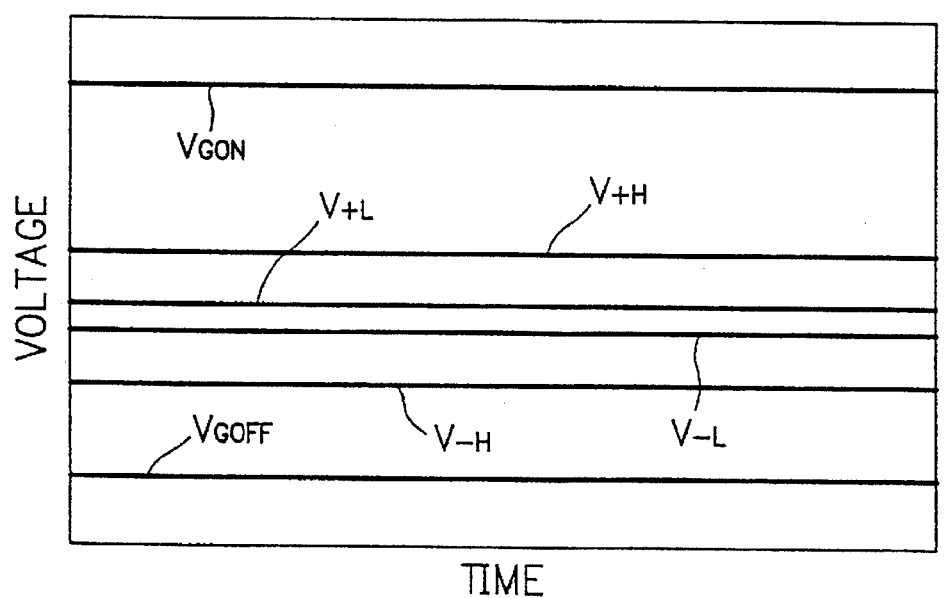
FIG. 11B is a timing chart of voltages in the integrated tablet device of FIG. 10.

FIGS. 11A and 11B show time charts of input signals to the drivers 34 and 35.

In FIG. 11A, designated at reference character CLK is a clock signal, VSYNC is a vertical synchronizing signal and HSYNC is a horizontal synchronizing signal. The clock signal CLK and the vertical synchronizing signal VSYNC are supplied from the timing generator 5 to the gate and source drivers 34 and 35, and the horizontal synchronizing signal HSYNC, from the timing generator 5 to the source drivers 35, in a later-described manner.

In FIG. 11B, designated at reference characters $V_{GON}$ and $V_{GOFF}$ are a gate-on voltage and a gate-off voltage, respectively, $V_{+H}$ and $V_{-H}$ are on-level voltages applied to liquid crystal, respectively, and $V_{+L}$ and $V_{-L}$ are off-level voltages applied to liquid crystal, respectively. These six voltages are kept constant without variations.

In the display writing operation period Td of FIG. 11A, the gate driver 34 and the source drivers 35 perform normal scan and writing operations to have the TFT-LCD display an image, so that external input signals to and internal voltages of the drivers 34 and 35 vary, as necessary.

Therefore, in the gate driver 34 in the period Td, the clock signal CLK and the vertical synchronizing signal VSYNC are processed to determine a timing by which a shift register supplies a corresponding one of bus line drive buffers with a signal for sequentially turning on to scan 480 gate bus lines.

In either or both of the source drivers 35 in the period Td, the clock signal CLK and the vertical and horizontal synchronizing signals VSYNC and HSYNC are processed to determine a timing to thereby write to 640 source bus lines a set of image data for a row of pixels corresponding to a gate bus line then scanned by the gate driver 34.

Concurrently therewith, in the other or both of the source drivers 35, an array of internal registers holds therein a set of image data for a row of pixels corresponding to a gate bus line next in order to the scanned gate bus line.

As the drivers 34 and 35 are operating, internal transistors thereof perform a rapid switching, causing noises.

Upon a transition from such the display writing operation period Td to the tablet operation period Tt, the timing generator 5 detects the latter Tt to be a current period, so that the clock signal CLK, the vertical synchronizing signal VSYNC and the horizontal synchronizing signal HSYNC being supplied to the drivers 34 and 35 are controlled to have their signal levels fixed as they are.

Therefore, internal voltages of the drivers 34 and 35 of a static type as described are also controlled to have their levels held as they are, until they vary in response to a variation of any of the three signals CLK, VSYNC and HSYNC.

Other voltages $V_{GON}$, $V_{GOFF}$, $V_{+H}$, $V_{-H}$, $V_{+L}$ and $V_{-L}$ (FIG. 11B) externally applied to the drivers 34 and 35 are inherently constant, as described.

Accordingly, all the voltages supplied to or developed in the drivers 34 and 35 are kept free of variations so that the internal transistors thereof stand unoperated, without noises due to their operations.

During the tablet operation period Tt, image signals input to the display does not vary, thus causing no noises.

With a transition from such the tablet operation period Tt to the display writing operation period Td, the timing generator 5 again supplies the clock signal CLK and the vertical and horizontal synchronizing signals VSYNC and HSYNC with varying levels and the drivers 34 and 35 start their operations for displaying an image.

In the foregoing description of the second embodiment, the three signals CLK, VSYNC and HSYNC are controlled to hold their signal levels when the operation period changes from Td to Tt. To this point, the signal levels to be held may be arbitrary, because like effects can be achieved unless such signal levels vary during the tablet operation period Tt.

Figure 12:
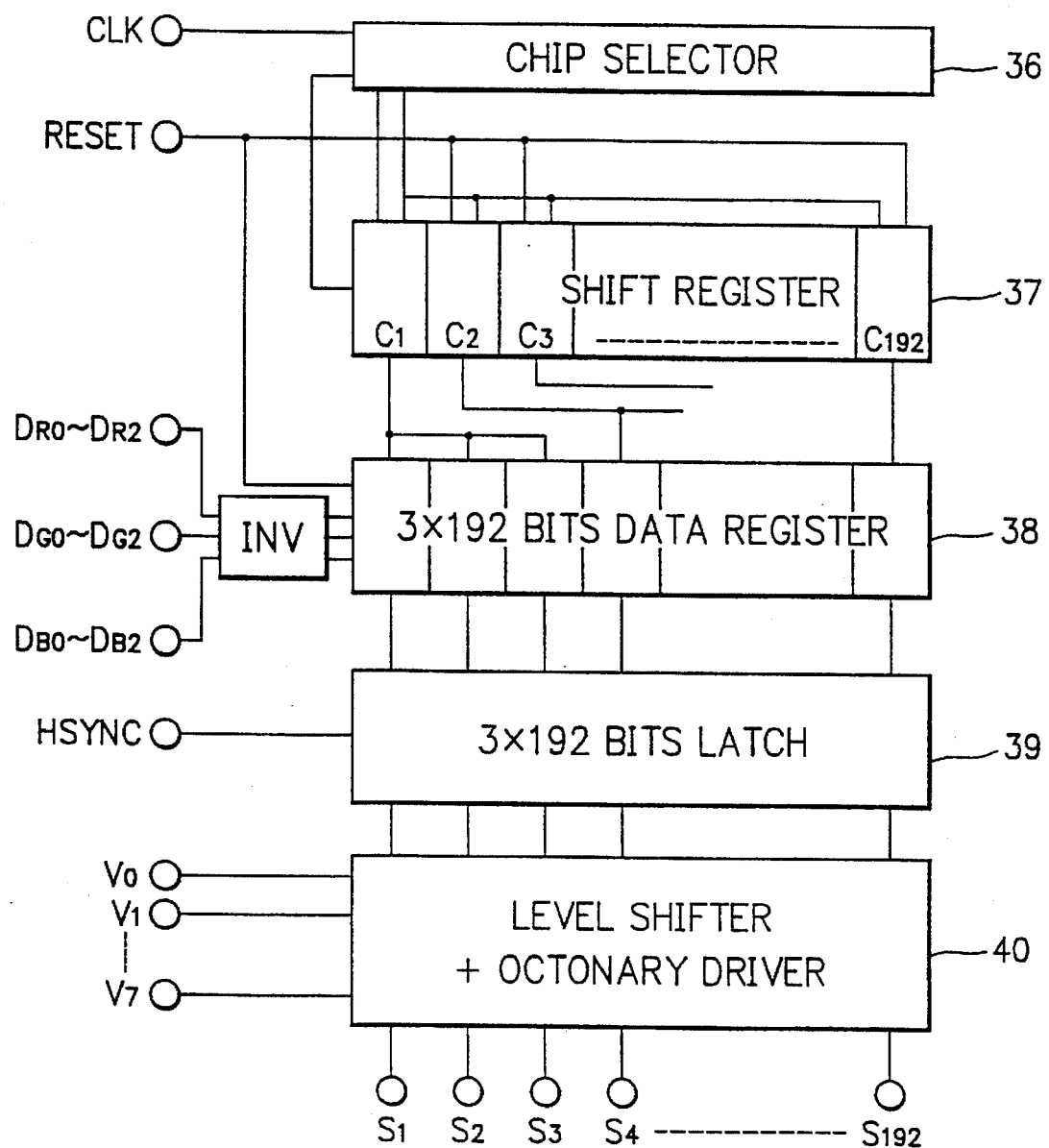
FIG. 12 is a block diagram of an exemplary source driver of the integrated table device of FIG. 10.

FIG. 12 shows, in a block diagram, a source driver IC of a digital type that employs a switching element for selecting one of a plurality of power supplies to be applied to liquid crystal. Description of this modification will be made of a case of an octal driver IC including 192 internal circuits each operative to select one of eight different power supplies $V_0$ to $V_7$.

Figure 14:
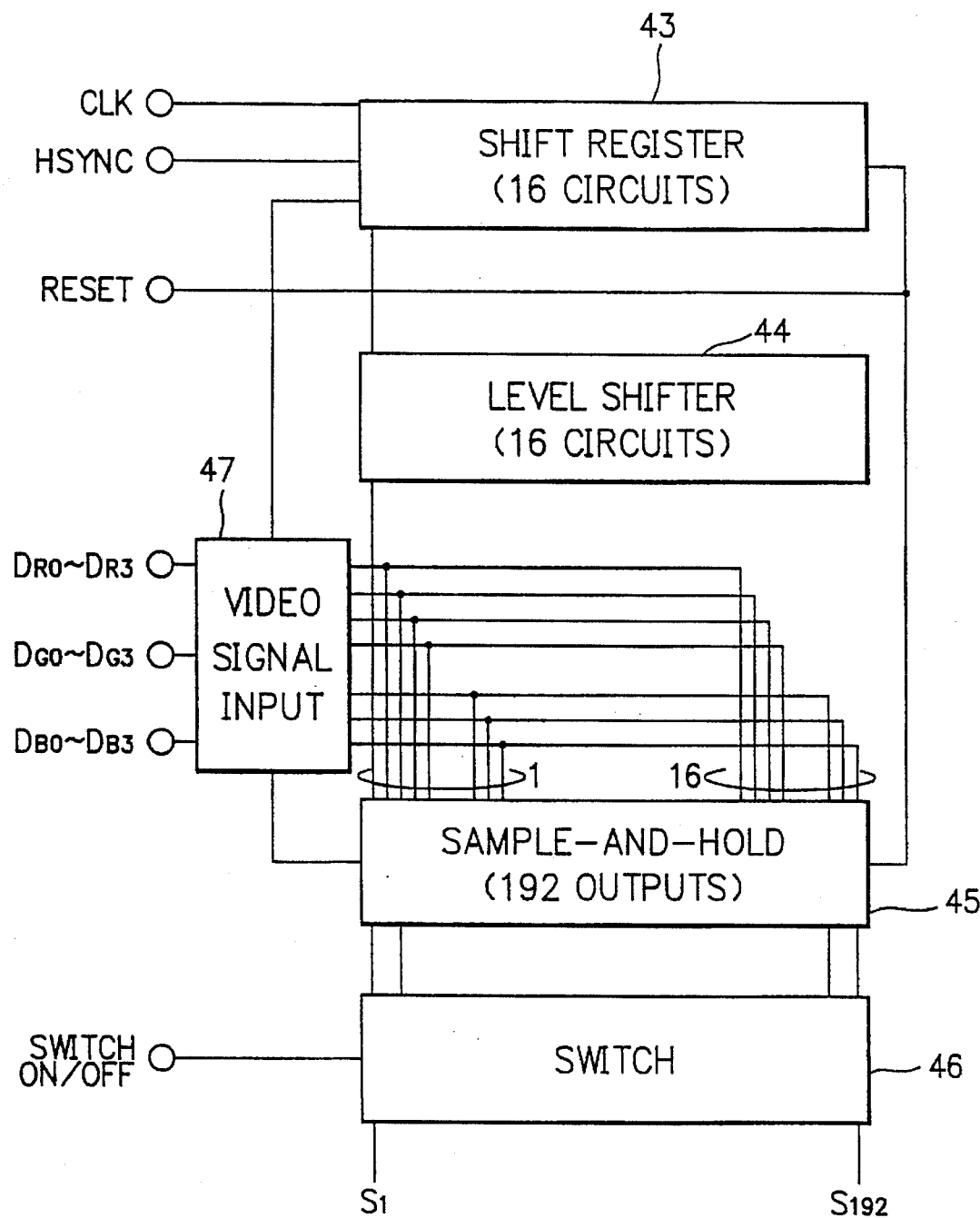
FIG. 14 is a block diagram of another source driver of the integrated tablet device of FIG. 10.

FIG. 14 shows, in a block diagram, a source driver IC of an analog type that employs a sampling and holding (hereafter "SH") circuit for holding an analog signal to be supplied via a buffer to a source driver. Description of this modification will also be made of the case of a driver IC having 192 outputs.

In FIG. 12, designated at character 36 is a chip selector for an on-off operation of the driver IC, 37 is a shift register for shifting a sequence of data, 38 is a data register for storing a set of data for a row of pixels next in a scan order to a row of of pixels being scanned for a current writing, 39 is a latch circuit composed of latches each for storing a data employable for selecting a power supply voltage to be output as a data, and 40 is an output driver composed of 192 internal circuits each adaptive to employ the stored data of a corresponding latch to select one of eight power supplies.

Figure 13:
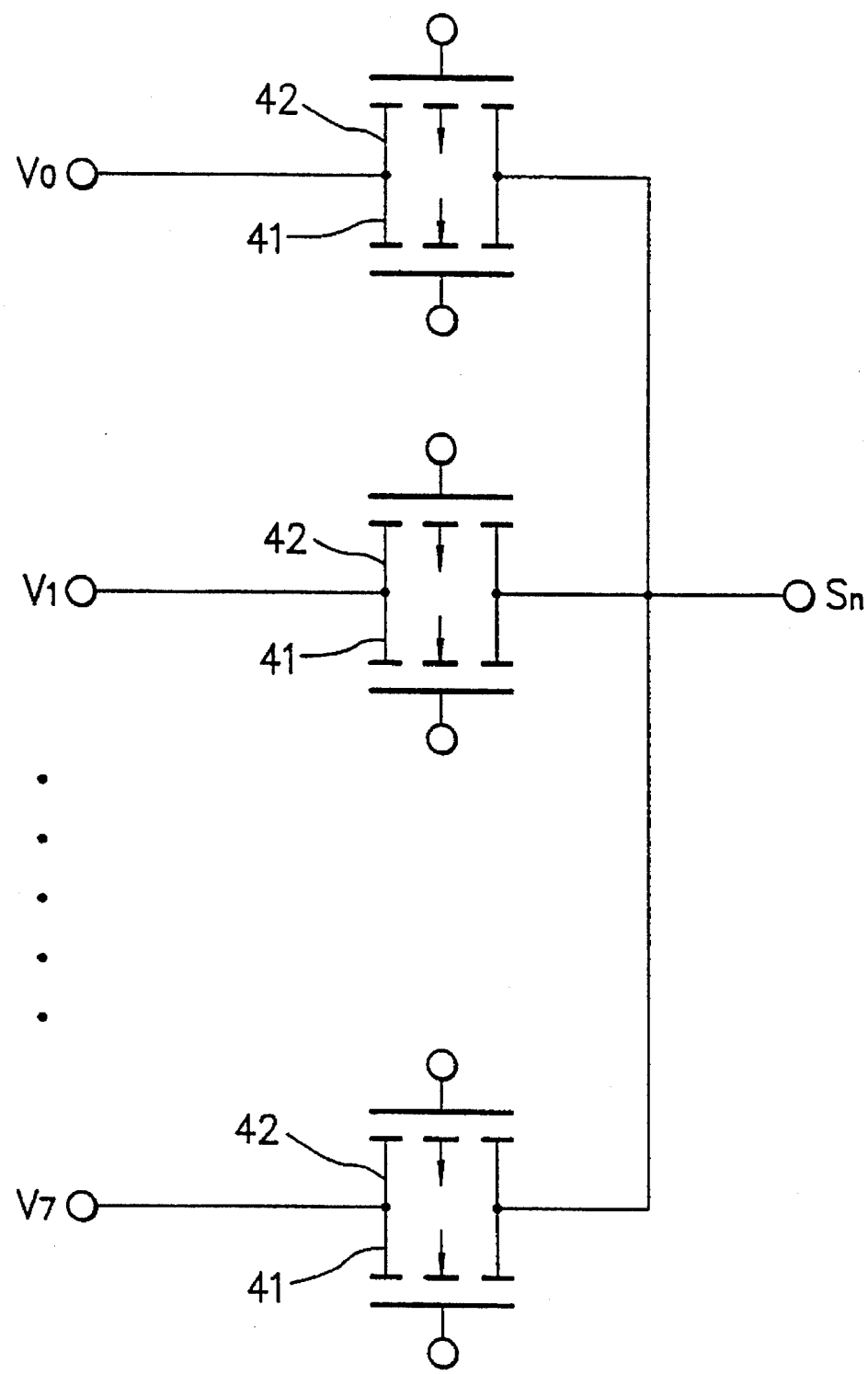
FIG. 13 is a circuit diagram of an output driver circuit of the integrated tablet device of FIG. 10.

FIG. 13 shows an equivalent circuit of one of the internal drive circuits of the output driver 40 of FIG. 12.

As shown in FIG. 13, the internal drive circuit comprises eight channels each composed of a transistor switch consisting of a p-channel MOS FET 41 and an n-channel MOS FET 42 coupled with each other. Each transistor switch is connected at an input terminal thereof to one of eight power supply terminals $V_0$ TO $V_7$ having their voltages and at an output end thereof to a common output terminal Sn (n=1 to 192).

Among the eight switches, that one which is connected to a desired power supply is selected to have a gate electrode thereof applied with an on-voltage of the MOS FET so that it turns on between a source electrode and a drain electrode thereof, permitting a power supply voltage to be supplied therethrough to a source bus line.

In FIG. 14, a shift register 43 generates a signal that identifies a source bus line for which an analog image signal is sent, and a level shifter 44 responds to the signal of the shift register 43 to effect a traffic control so that the image signal is input to a corresponding channel of an SH circuit 45, where it is stored. Designated at reference character 46 is a switch circuit.

Operation of the digital driver IC of FIG. 12 will be described. For a better understanding, the description will assume a particular case in which a personal computer oriented display having a diagonal size of 24 cm and an RGB pixel matrix of vertical 480×horizontal 640 dots is combined with the digital driver IC.

In FIG. 10, ten source driver $IC_s$ are now employed. Number of outputs of the source drivers thus amounts to 192×10=1920 which is equal to a total number of source bus lines 640×RGB=640×3=1920.

The source bus lines are coupled to an counter electrode by a capacitor (of which a capacitive component will be referred "$C_{DC}$") through liquid crystal. The capacitive component $C_{DC}$ is cooperative with a resistive component of the counter electrode to determine a time constant of the counter electrode.

The capacitive component $C_{DC}$ is related to an anisotropy of a dielectric constant of liquid crystal, and is variable in dependence on a voltage applied to an associated source bus line, not promptly after the voltage is imposed on liquid crystal, but with a varying capacitance transient with time so that it is practically difficult to determine the $C_{DC}$ of a source bus line at a certain time point.

In a display writing operation period Td, the source driver $IC_s$ drive source bus lines, with their output drivers 40 electrically coupled therewith to supply voltages representative of image data. Just before the end of the display writing operation period Td, the voltages are imposed on pixels in a pixel row corresponding to a last scanned gate bus line.

With a transition from the display writing operation period Td to a tablet operation period Tt, all the output drivers 40 of the source bus driver ICs, rendering the source bus lines floating.

Along with the transition of operation period, a volume of liquid crystal resting between a respective one of the source bus lines and the counter electrode responds to a variation of an imposed voltage thereon to have a gradually varying $C_{DC}$ value, which depends on a voltage having been imposed till then, as described, and should be different from that of another bus line.

If the $C_{DC}$ is coupled via the source bus line to a power supply of an associated source driver IC, the resistive component of the counter electrode would have cooperated therewith to constitute a time constant that might be different in dependence an applied voltage to the source bus line.

However, upon the transition to the tablet operation period Tt, an electrode on a side of the source bus line with the $C_{DC}$ enters a floating state in which the $C_{DC}$ does not contribute to a time constant of the counter electrode.

As other principal capacitive components contributable to the time constant of the counter electrode 1, the counter electrode and gate bus lines have their capacitive components, which however are subjected to voltages having substantially identical levels so that a fraction of time constant attributable thereto is substantially equivalent.

Accordingly, when a coordinate defining signal is applied for detecting a position pointed by a pen 2 in the tablet operation period Tt, the counter electrode 1 has a substantially equivalent time constant irrespective of a displayed image, thus permitting a precise detection of the pointed position.

With a transition from such the tablet operation period Tt to the display writing operation period Td, a transistor switch in an internal circuit of the output driver 40 turns on, applying a voltage to the source bus line, thus imposing an associated voltage on a pixel electrode of the display.

In the foregoing third embodiment, a source driver IC includes a circuit controllable to provide an output driver with a relatively high impedance at an output end thereof.

In a modification, a buffering amplifier may be additionally connected to have an output of a driver IC subjected to a high impedance stage, as necessary, while the output is connected to a source bus line, to achieve a similar effect.

Moreover, TFT switches may be formed at a side to be connected to a driver of source bus lines on a substrate formed with scan lines and signal lines so that driver impedances at the bus line side becomes high, as TFTs are turned off, to achieve a similar effect.

The present invention was empirically applied to a personal computer oriented display with a 24 cm diagonal size and a matrix of vertical 480×horizontal 480 RGB pixels, with a result that a tablet performance of a 200 μm resolution was secured irrespective of a varying displayed image, without penalty to a readiness to look and without increases such as in weight, volume and thickness.

As described above, an integrated tablet device according to the invention employs an counter electrode of a display as part of a tablet to have a reduced weight about half of that of a conventional tablet assembled with a display.

According to the invention, no extra tablet is put between a display and a pen point for a signal detection so that a parallax free display is enabled.

Further, according to the invention, a driver IC with simplified circuitry is permitted to drive gate bus lines and source bus lines, like the case of absent tablet.

In an integrated tablet device according to an embodiment of the invention, outputs of a driver IC are subjected to a high impedance to avoid causing time constants of a tablet to be varied thereamong with variations in liquid crystal capacitance between an counter electrode and bus lines due to differences of voltages applied to the bus lines.

Furthermore, according to an embodiment of the invention, an integrated tablet device has a static driver in which a voltage of a clock signal or a vertical or horizontal synchronizing signal is held at a level until it changes with a transition of operation period, as if such a signal voltage were interrupted to reduce noises.

Still more, according to an embodiment of the invention, a coordinate data may be accessed in a table looking up manner, permitting a simplified constitution and a rapid processing.

Yet more, according to an embodiment of the invention, vertical and horizontal coordinates of a pointed position are detected in a period different from a period for writing image data to pixel electrodes, separately in a time-dividing manner or concurrently, with an improved accuracy.

According to another embodiment of the invention, in a tablet operation period, a signal to a driver IC is interrupted to thereby hold a clock signal so that a driver operation is interrupted, permitting an effective reduction of noises that otherwise might be a significant cause of an erroneous tablet operation.

While the present invention has been described in its preferred embodiments with reference to the accompanying drawings, it will be appreciated that various changes and modifications can be made by those skilled in the art without departing from the spirit and scope of the present invention.

What is claimed is:

1. An integrated tablet device comprising an active matrix liquid crystal image display system for displaying an image in a display region, the liquid crystal display comprising:

an insulating substrate;

a plurality of scan lines formed in parallel on the insulating substrate;

a plurality of signal lines formed in parallel on the insulating substrate, the plurality of signal lines crossing the plurality of scan lines to form a matrix of lattice points;

scan and signal line drivers for driving the plurality of scan lines and the plurality of signal lines;

a thin-film transistor formed in a vicinity of each of the lattice points;

a pixel electrode connected to the thin-film transistor;

an opposite substrate opposing the insulating substrate;

a counter electrode formed on the opposite substrate;

liquid crystal filling the gap between the insulating substrate and the opposite substrate so that the pixel electrode and the counter electrode has a pixel capacitance established through the liquid crystal; and a position detecting system for detecting a pointed position on the display region, the position detecting system comprising:

a first pair of electrodes positioned in parallel along y-direction sides of and on the inner surface of said opposite substrate;

a second pair of electrodes positioned in parallel along x-direction sides of and on the inner surface of said opposite substrate;

means for applying a first voltage and a second voltage to said first and second pairs of electrodes;

means for sensing an electrostatic signal caused by an application of one of said first and second voltages of said lattice points at said pointed position;

means for calculating coordinates of said pointed position from said electrostatic signal on the basis of a voltage drop between one of said first pair of electrodes and said second pair of electrodes; and control means responsive to a clock signal, a horizontal sync signal and a vertical sync signal for controlling said means for applying voltages and said means for calculating coordinates, said control means comprising:

first means operative in an x-coordinate detection for applying a first alternating voltage to said first pair of electrodes; and second means operative in a y-coordinate detection for applying a second alternating voltage to said second pair of electrodes.

2. An integrated tablet device according to claim 1, wherein said controlling means further comprises:

third means opposing a display period for applying an identical voltage to all of said first and second pairs of electrodes.

3. An integrated tablet device according to claim 1, wherein said means for calculating coordinates of said pointed position comprises:

means for calculating said coordinates according to the expression:

$x = X \times e_x/E_x$, and
$y = Y \times e_y/E_y$, where X and Y are the distances between said first pair of electrodes and between said second pair of electrodes, $E_x$ and $E_y$ are said first and second voltages applied to said first and second pairs of electrodes, and $e_x$ and $e_y$ are voltages of said signals caused by said application of first voltage and said application of second voltage, respectively.

4. An integrated tablet device according to claim 1, wherein an output impedance of said scan and signal line drivers are made high so as to be electrically isolated from said plurality of scan lines and said plurality of signal lines during each period of said x-coordinate detection and said y-coordinate detection.

5. An integrated tablet device according to claim 1, wherein each of said scan line and signal line drivers comprise static elements.

6. An integrated tablet device according to claim 1, wherein said means for calculating coordinates of said pointed position comprises:

non-volatile memory means for storing values of said sensed electrostatic signal and corresponding positions on said opposite substrate; and means responsive to said electrostatic signal for referring to said memory means for an x-coordinate of said pointed position and for a y-coordinate of said pointed position.

7. An integrated tablet device according to claim 1, wherein said control means comprises:

means for controlling said first means operative in an x-coordinate and said second means operative in a y-coordinate to operate in a time division multiplexed manner.

8. An integrated tablet device according to claim 1, wherein said control means comprises:

means for controlling said first means operative in an x-coordinate and said second means operative in a y-coordinate to operate concurrently at different frequencies, said means for sensing comprising:

filter means for filtering said electrostatic signal to yield two signals of different frequencies.

9. An integrated tablet device according to claim 1, further comprising:

means for suspending operation of said scan line and signal line drivers during each period of said x-coordinate detection and said y-coordinate detection.

10. An integrated tablet device according to claim 9, wherein said means for suspending operation further comprises:

means for suspending supplying said scan line and signal line drivers with a clock signal, a horizontal signal and a vertical signal during each period of said x-coordinate detection and said y-coordinate detection.

11. A display device for determining display screen coordinates for a pointed to position, comprising:

a display screen having a flat electrode covering a substantially rectangular display surface;

a pair of x-coordinate electrodes positioned on opposite vertical sides of said rectangular display surface;

a pair of y-coordinate electrodes positioned on opposite horizontal sides of said of said rectangular display surface;

means for applying an electrical signal between said pair of x-coordinate electrodes and said pair of y-coordinate electrodes through said flat electrode;

pointing means for contacting a position on said flat electrode to detect a voltage level for said electrical signal; and means for determining a set of display screen coordinates for said pointing means from said voltage level.

12. A display device for determining display screen coordinates for a pointed to position as recited in claim 11 wherein said means for determining comprises:

a memory look-up table for storing a plurality of voltage levels corresponding to said position.

13. A display device for determining display screen coordinates for a pointed to position as recited in claim 11 wherein said means for applying said electrical signal applies said electrical signal between said pair of x-coordinate electrodes and said pair of y-coordinate electrodes in a time division multiplexed manner.

14. A display device for determining display screen coordinates for a pointed to position as recited in claim 11 wherein said electrical signal comprises an x-coordinate electrical signal having a first frequency and a y-coordinate electrical signal having a second frequency.

15. A display device for determining display screen coordinates for a pointed to position as recited in claim 14 further comprising a filtering means for discriminating between said x-coordinate electrical signal having said first frequency and said y-coordinate electrical signal having said second frequency.

16. A display device for determining display screen coordinates for a pointed to position as recited in claim 11 wherein said display screen is a liquid crystal display.

17. A display device for determining display screen coordinates for a pointed to position as recited in claim 16 wherein said flat electrode is a counter electrode for said liquid crystal display device.

18. A display device for determining display screen coordinates for a pointed to position as recited in claim 11 wherein said pointing means comprises an electrically conductive pen.

19. A display device for determining display screen coordinates for a pointed to position as recited in claim 11 wherein said voltage level is determined from an electrostatic capacitance between said pointing means and said flat electrode.

* * * * *